United States Patent [19]
Reber et al.

[11] Patent Number: 5,969,324
[45] Date of Patent: Oct. 19, 1999

[54] ACCOUNTING METHODS AND SYSTEMS USING TRANSACTION INFORMATION ASSOCIATED WITH A NONPREDICTABLE BAR CODE

[75] Inventors: William L. Reber, Schaumburg, Ill.; Cary D. Perttunen, Shelby Township, Mich.

[73] Assignee: Motorola, Inc., Schuamburg, Ill.

[21] Appl. No.: 08/833,858

[22] Filed: Apr. 10, 1997

[51] Int. Cl.[6] .................................................. G06K 5/00
[52] U.S. Cl. ................ 235/462.13; 235/383; 235/462.01
[58] Field of Search ................................. 235/379, 380, 235/383, 462, 487, 462.01, 462.13

[56] References Cited

U.S. PATENT DOCUMENTS

| | | | |
|---|---|---|---|
| 4,599,489 | 7/1986 | Cargile | 178/22.08 |
| 4,720,860 | 1/1988 | Weiss | 380/23 |
| 5,168,520 | 12/1992 | Weiss | 380/23 |
| 5,278,396 | 1/1994 | McGaha | 235/383 |
| 5,594,226 | 1/1997 | Steger | 235/379 |
| 5,696,909 | 12/1997 | Wallner | 235/379 |

*Primary Examiner*—Donald Hajec
*Assistant Examiner*—Drew A. Dunn
*Attorney, Agent, or Firm*—James E. Gauger

[57] ABSTRACT

An accounting system includes a point of sale terminal (20) to print a transaction receipt (26) having a nonpredictable bar code (36) and human-readable transaction information (34) based upon the transaction data. The point of sale terminal (20) communicates the transaction information to a transaction information system. The transaction information is downloaded from the transaction information system by reading the nonpredictable bar code (36) with a data reader (54).

14 Claims, 6 Drawing Sheets

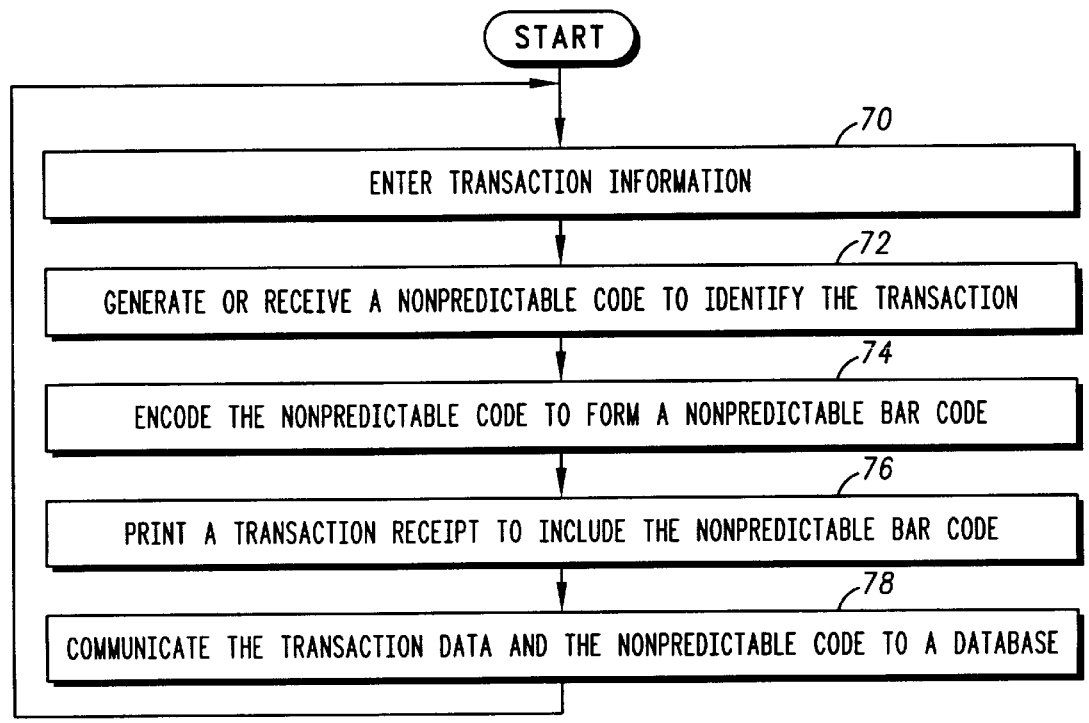
FIG. 2
FIG. 3
FIG. 4

FILENAME: 5988436319937665892

ABC HOTEL
JOHN Q DOE
123 MAIN STREET
ANYTOWN, USA

| DATE | TRANSACTION NAME | CATEGORY | AMOUNT |
|---|---|---|---|
| 3/3/97 | ROOM CHARGE | LODGING | $100.00 |
| 3/3/97 | 555-0000 | TELEPHONE | $3.00 |
| 3/3/97 | RESTAURANT | MEALS | $10.00 |
| 3/4/97 | CHARGE CARD | | $113.00CR |

FILENAME: 3642627749283170522

XYZ CAR RENTAL
JOHN Q DOE
123 MAIN STREET
ANYTOWN, USA

| DATE | TRANSACTION NAME | CATEGORY | AMOUNT |
|---|---|---|---|
| 3/4/97 | RENTAL CAR | RENTAL CAR | $40.00 |
| 3/4/97 | CHARGE CARD | | $40.00CR |

FILENAME: 8227014410713909388

UKL AIRLINES
JOHN Q DOE
123 MAIN STREET
ANYTOWN, USA

| DATE | TRANSACTION NAME | CATEGORY | AMOUNT |
|---|---|---|---|
| 3/3/97 | LV/DTW AR/LAX | AIRFARE | $1000.00 |
| 3/4/97 | LV/LAX AR/DTW | AIRFARE | |

FILENAME: 9752809700020835872

QRS STORE

3/1/97      15:32

SOUP     $0.89
BREAD    $1.25
TAX      $0.13
CASH     $2.27CR

EXPENSE REPORT FOR: JOHN Q. DOE    DESTINATION: LOS ANGELES

| DATE: | | 3/3/97 | 3/4/97 | | | | | |
|---|---|---|---|---|---|---|---|---|
| DAY: | SUN. | MON. | TUES. | WED. | THURS. | FRI. | SAT. | |
| ITEM | | | | | | | | CHARGE |
| AUTO-MILEAGE | | | | | | | | |
| AIR FARE | | $1000.00 | | | | | | $1000.00 |
| TAXI | | | | | | | | |
| PARKING | | | | | | | | |
| LODGING | | $100.00 | | | | | | $100.00 |
| MEALS | | $10.00 | | | | | | $10.00 |
| TIPS | | $3.00 | | | | | | $3.00 |
| TELEPHONE | | | $40.00 | | | | | |
| PHOTOCOPIES | | | | | | | | |
| OTHER | | | | | | | | |
| TOTALS: | | $1113.00 | $40.00 | | | | | $1153.00 | ized
ACCOUNTING METHODS AND SYSTEMS USING TRANSACTION INFORMATION ASSOCIATED WITH A NONPREDICTABLE BAR CODE

RELATED APPLICATIONS

The present application is related to the following applications:

"Electronic Network Navigation Device and Method for Linking to an Electronic Address Therewith", having Ser. No. 08/710,820, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Ser. No. 08/732,956, filed Oct. 17, 1996;

"Method, System, and Article of Manufacture for Producing a Network Navigation Device", having Ser. No. 08/744,338, filed Nov. 7, 1996;

"Bar Code Display Apparatus", having Ser. No. 08/864,135, filed May 28, 1997; and "Transaction Methods, Systems, and Devices", having Ser. No. 08/858,184, filed May 28, 1997;

The subject matter of the above-identified related applications is hereby incorporated by reference into the disclosure of this application.

TECHNICAL FIELD

The present invention relates to methods, systems, and devices for electronic recordkeeping of accounting data.

BACKGROUND OF THE INVENTION

Many software packages are available for automating accounting procedures using a personal computer. Quicken® from Intuit is one example of an accounting software package. Quicken® assists or automates accounting procedures such as writing checks, updating a check register, reconciling an account, setting up a budget for income and expenses, tracking transactions, business or personal bookkeeping, and tax-related information gathering.

A disadvantage of using present accounting software is that many transactions have to be manually entered from a receipt obtained from a point of sale. For example, using a keyboard, an end user may have to manually enter a category of the transaction, items in the transaction, credits or debits in the transaction, a method of payment, a transaction date, and/or a name of a transaction party from the receipt.

Sears, Roebuck & Co. prints receipts having bar codes associated with transactions at its department stores. Each bar code is predictably formed to consist of a first code identifying a store at which the transaction occurred, a second code identifying a point of sale terminal in the store, and a third code indicating a transaction number. The transaction number is incremented for each subsequent transaction at the point of sale terminal. The bar code can be read by a point of sale terminal to retrieve transaction information associated with the receipt. However, the transaction information is not widely accessible by customers over an electronic network, such as the Internet, for import to an accounting software package.

BRIEF DESCRIPTION OF THE DRAWINGS

The invention is pointed out with particularity in the appended claims. However, other features of the invention are disclosed in the following detailed description in conjunction with the accompanying drawings in which:

FIG. 2 is a flow chart of an embodiment of a method of making the transaction receipt;

FIG. 3 is an illustration of a first example of the transaction receipt;

FIG. 4 is an illustration of a second example of the transaction receipt;

FIG. 9 illustrates an example of data stored by the database;

FIG. 11 is an illustration of an example of the report formed using the transaction receipts described with reference to FIGS. 3, 4, and 5.

DETAILED DESCRIPTION OF A PREFERRED EMBODIMENT

Embodiments of the present invention advantageously provide automated approaches for entering transaction information associated with a receipt. Preferably, the receipt includes a nonpredictable bar code which identifies a transaction. The transaction information is downloaded to the end user by reading the nonpredictable bar code with an optical data reader.

Figure 1:
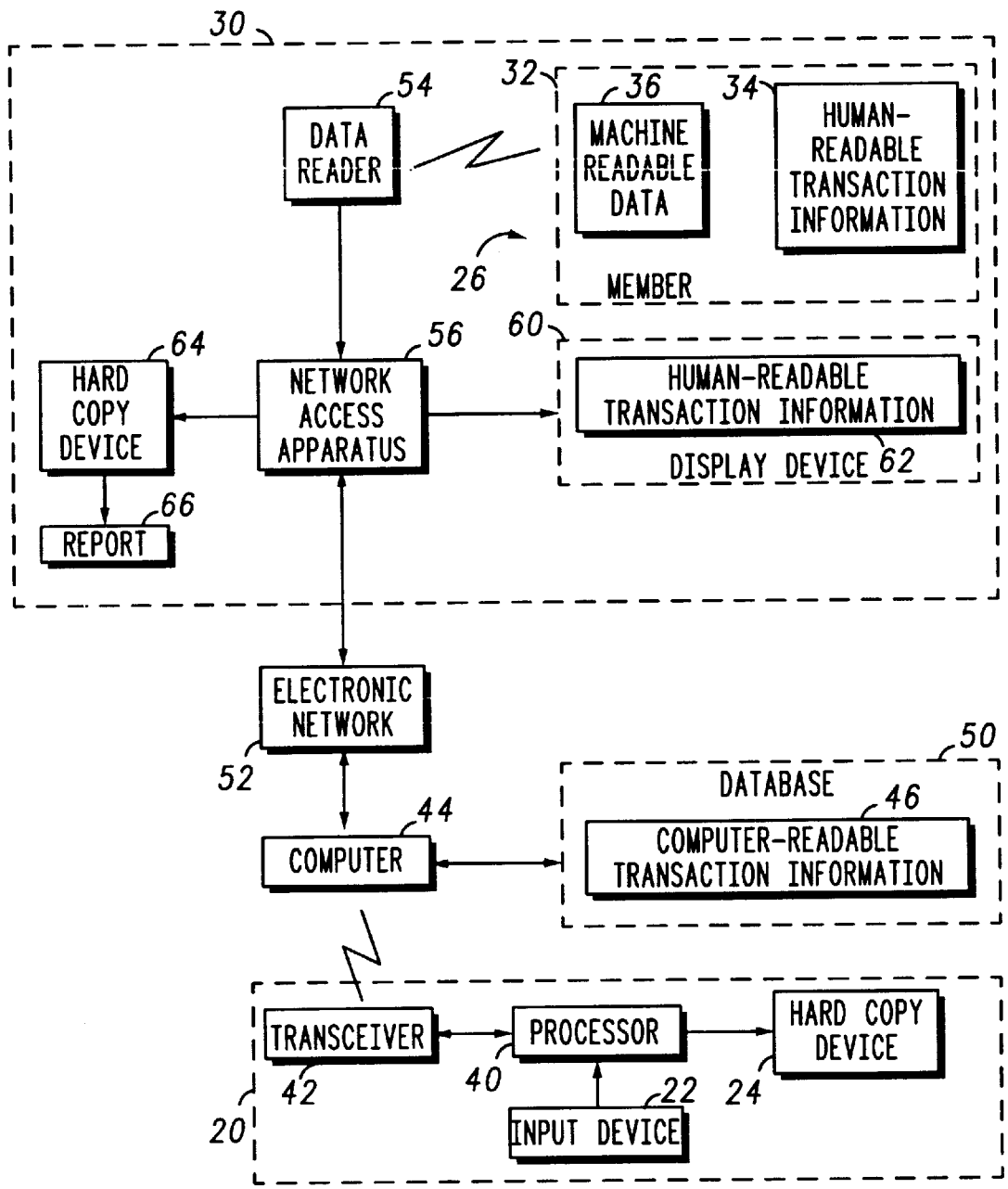
FIG. 1 is a block diagram of an embodiment of an accounting system in accordance with the present invention.

FIG. 1 is a block diagram of an embodiment of an accounting system in accordance with the present invention. The accounting system includes a point of sale terminal 20 or a like apparatus at a transaction point. The point of sale terminal 20 includes at least one input device 22 such as a keyboard, a bar code reader, and/or a card reader for entering transaction data at a point of sale. The point of sale terminal 20 further includes a hard copy device 24, such as a printer, responsive to the at least one input device 22 to print a transaction receipt 26.

After being printed, the transaction receipt 26 can be transported to a user location 30 as illustrated in FIG. 1. Typically, the user location 30 is remotely located from the point of sale. For example, the user location 30 can be at an end user's place of work or place of residence in comparison to the point of sale being at a store. In general, the user location 30 can be located in another building, another city, another county, another state, or another country with respect to the location of the point of sale.

The transaction receipt 26 includes a member 32 to support human-readable transaction information 34 and machine-readable data 36. Preferably, the member 32 includes a substantially flat substrate formed of a dielectric or nonmagnetic material such as paper, cardboard, or plastic.

The human-readable transaction information 34 is based upon the transaction data entered into the point of sale terminal 20. The human-readable transaction information 34 can include a printed representation of a list of items in a transaction, quantities of the items, dates and times associated with the items, charges or credits associated with the items, and names of parties involved in the transaction.

Preferably, the machine-readable data 36 includes at least one printed code to identify the transaction and/or to identify individual items in the transaction. Each printed code can include a bar code such as a one-dimensional bar code or a two-dimensional bar code. Examples of one-dimensional bar codes include, but are not limited to, 3 of 9, UPC-A, UPC-E, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, DataMatrix and PDF417. Using bar codes, each printed code is human-viewable but practically human-unreadable from the transaction receipt 26.

Preferably, the machine-readable data 36 includes a nonpredictable bar code to identify the transaction. A nonpredictable bar code can be formed by converting a nonpredictable series of numeric characters or a nonpredictable series of alphanumeric characters to a bar code representation in accordance with a bar code standard. A nonpredictable series of characters can be formed by any of the code generators described in U.S. Pat. Nos. 4,599,489, 4,720,860, and 5,168,520 which are hereby incorporated by reference into this disclosure.

Generally, the nonpredictable bar code is generated using either a random process or a pseudorandom process. Embodiments of methods and systems for generating a random or a pseudorandom bar code are described in the application entitled "Bar Code Display Apparatus" which is incorporated by reference into this disclosure. It is noted that the term "pseudorandom" describes entities that are selected by a definite computational process, but that satisfy one or more standard tests for statistical randomness.

A nonpredictable code can be generated by a processor 40 at the point of sale terminal 20 or by a remote processor. The processor 40 can include a microprocessor, an application-specific integrated circuit, a custom integrated circuit, or the like to generate the nonpredictable code.

If generated by the remote processor, a transceiver 42 receives the nonpredictable code for use by the point of sale terminal 20. If generated locally, the processor 40 executes a pseudorandom sequence generator routine, such as a pseudorandom number generator routine, to form the nonpredictable code. Regardless of where the nonpredictable code is generated, the processor 40 provides means for encoding the nonpredictable code in accordance with a bar code standard to form the nonpredictable bar code.

Using the transceiver 42, the point of sale terminal 20 communicates at least a portion of the transaction information to a computer 44. Based upon the transaction information received thereby, the computer 44 stores computer-readable transaction information 46 in a database 50. The computer 44 and the database 50 serve as a transaction information system. The computer-readable transaction information 46 is accessible via an electronic network 52 in communication with the computer 44. Preferably, the computer 44 includes a server or like processing apparatus which serves as a node in the electronic network 52.

Preferably, the electronic network 52 includes a wide area network such as the Internet, the World Wide Web, or an online service to provide accessibility to the computer 20 for a wide geographical area. Other examples of the electronic network 52 include but are not limited to: an intranet, a local area network, a telephone network such as a public switched telephone network, a cellular telephone network, a personal communication system (PCS) network, a television network such as a cable television system, a paging network such as a local paging network, a regional paging network, a national paging network, or a global paging network, and a wireless data network such as a satellite data network or a local wireless data network.

To access the computer-readable transaction information 46, an end user reads the machine-readable data 36 using a data reader 54. Preferably, the data reader 54 includes an optical data reader to read printed data or human-viewable data (which may or may not be human-readable data) on the transaction receipt 26. Examples of optical data readers include, but are not limited to, an optical scanner, a page scanner, a handheld scanner, a photograph reader, a business card reader, a bar code reader, a scanning wand, a linear CCD (charge coupled device) reader, a two-dimensional CCD reader, and a fax machine.

Alternatively, the data reader 54 can include a magnetic data reader to read magnetically-stored transaction data, or an electronic data reader to read electronically-stored transaction data. Embodiments of alternative data readers are described in the above-listed applications incorporated by reference into this disclosure.

The data reader 54 communicates a signal representative of the machine-readable data 36 to a network access apparatus 56. The network access apparatus 56 facilitates communication between the data reader 54 and the electronic network 52. The network access apparatus 56 can have a variety of forms, including but not limited to, a general purpose computer, a network computer, a network television, an Internet television, an Internet telephone, a portable wireless device, a television receiver, a game player, and a video recorder.

Regardless of its form, the network access apparatus 56 typically includes a processor in communication with at least one input device, a memory, and at least one storage device. The processor can include a microprocessor, an application specific integrated circuit, or other suitable integrated circuit. The memory can include a read-only memory and/or a random access memory in communication with the processor. The at least one input device can include a keyboard and/or a pointing device for receiving user-initiated events from an end user. The at least one storage device can include a floppy disk drive, a PC card storage device, an optical drive, a DVD drive, or a hard drive to store computer-readable data.

The network access apparatus 56 communicates data associated with the machine-readable data 36 to the electronic network 52. The electronic network 52, in turn, communicates the data to the computer 44. Preferably, the data is encrypted by the network access apparatus 56 prior to its transmission via the electronic network 52. In this case, the computer 44 decrypts data received from the electronic network 52 to recover the original data.

The computer 44 retrieves the computer-readable transaction information 46 from the database 50 based upon the signal. Preferably, the computer-readable transaction information 46 is indexed by a nonpredictable code encoded in the machine-readable data 36. By making the code nonpredictable, the computer-readable transaction information 46 is practically inaccessible by unauthorized parties.

The computer 44 communicates the computer-readable transaction information 46 to the electronic network 52. The electronic network 52, in turn, communicates the transaction information to the network access apparatus 56. Preferably, the transaction data is encrypted by the computer 44 prior to its transmission via the electronic network 52. In this case, the network access apparatus 56 decrypts data received from the electronic network 52 to recover the transaction data.

The network access apparatus 56 is operative to process, store, display, print, and/or communicate the transaction information in accordance with a software routine executed thereby. For example, the network access apparatus 56 can process and store the transaction information using spreadsheet software, accounting software, bookkeeping software, or tax preparation software such as Quicken®, QuickBooks, and TurboTax from Intuit, Excel, Money, and Works from Microsoft, 1-2-3 from Lotus, Quattro® from Corel, Peachtree Accounting, and TaxCut from Kiplinger.

Additionally, the network access apparatus 56 can command a display device 60 to display human-readable transaction information 62. The human-readable transaction information 62 corresponds to the transaction information received from the computer 44. The display device 60 can include a liquid crystal display (LCD) or a cathode ray tube (CRT) display, for example, having an array of display elements or pixels for displaying textual information and graphical information based upon the transaction information.

Further, the network access apparatus 56 can command a hard copy device 64 to print a report 66 based upon the transaction information. Examples of the report 66 include but are not limited to a spreadsheet, a tax form, a balance sheet, an expense report, and a transaction report.

The transaction information can be communicated by the network access apparatus 56 to a remote computer for purposes including, but not limited to, electronic payment for the transaction, electronic tax form submission, and electronic report submission.

FIG. 2 is a flow chart of an embodiment of a method of making the transaction receipt 26. Preferably, the method is performed by the point of sale terminal 20 described with reference to FIG. 1. Regardless of where the transaction is performed, the transaction receipt 26 is generated to document the transaction.

As indicated by block 70, the method includes a step of entering transaction information. The transaction information can be entered by a keypad, a bar code reader, a magnetic stripe reader, and/or received by a receiver. Typically, the transaction information is entered at a point of sale at which the transaction occurs.

As indicated by block 72, the method includes a step of generating or receiving a nonpredictable code to identify the transaction. The nonpredictable code can be generated by the point of sale terminal 20 or received from an external code generator.

As indicated by block 74, the method includes a step of encoding the nonpredictable code to form a nonpredictable bar code. This step can include encoding a nonpredictable sequence of characters in accordance with a predetermined bar code standard.

As indicated by block 76, the method includes a step of printing the transaction receipt 26 to include the nonpredictable bar code. The step of printing the transaction receipt 26 can include printing other information as described for embodiments of the transaction receipt 26.

As indicated by block 78, the method includes a step of communicating transaction data and the nonpredictable code associated with the transaction receipt to the database 50.

The transaction data is communicated by the transceiver 42 to the computer 44 using either the electronic network 52 or another communication link. The transaction data can include any combination of a list of items in the transaction, dates and times associated with the items, charges or credits associated with the items, and parties involved in the transaction. The parties can include a first party such as a creditor, a seller, a merchant, a manufacturer, a payee, or other like entity which receives money in the transaction. The parties can include a second party such as a debtor, a purchaser, a buyer, or other like entity which spends money in the transaction. The second party can include an end user, an organization associated with the end user, an organization associated with the user location 30, or an account associated with any of the above-listed entities.

The computer 44 stores the data in the database 50. The database 50 indexes the transaction data by the nonpredictable code. For example, the nonpredictable code can form part of a filename for a file containing the transaction data. Alternatively, the nonpredictable code can be included in a record of the transaction data. Such a record is content addressable using the nonpredictable code.

Flow of the method is directed back to block 70 to generate subsequent transaction receipts for other transactions.

FIG. 3 is an illustration of a first example of the transaction receipt 26. The transaction receipt 26 documents a transaction between a fictitious ABC Hotel and a fictitious end user named John Q. Doe. The transaction receipt 26 is printed by the point of sale terminal 20 at the fictitious ABC Hotel. The point of sale terminal 20 can comprise a computer terminal, a card reader, and a printer to print the transaction receipt 26. The transaction receipt 26 is retained by the fictitious end user for his/her records.

The member 32 of the transaction receipt 26 includes a substantially flat substrate formed of a dielectric or nonmagnetic material such as paper, cardboard, or plastic. The human-readable transaction information 34 supported by the member 32 includes information 80 identifying the fictitious hotel, information 82 identifying the fictitious end user, and information 84, 86, 88, and 90 for four transaction items. Each set of the information 84, 86, 88, and 90 can include a date, a name, a category, and an amount for its corresponding item.

The machine-readable data 36 includes a nonpredictable bar code 92 to identify the transaction. Preferably, the nonpredictable bar code 92 provides information for automatically linking the network access apparatus 56 to a resource or a destination (such as a Web page) provided by the computer 44. In this case, the nonpredictable bar code 92 can encode an electronic address such as a URL (uniform resource locator), a URN (a uniform resource name), or an IP (Internet Protocol) address.

A first portion of the electronic address can be fixed and predictable, e.g. "www.mot.com/", while a second portion of the electronic address is nonpredictable, e.g. "598843631937665892". When concatenated, the electronic address "www.mot.com/598843631937665892" identifies the computer-readable transaction information 46 for the hotel stay.

Optionally, the machine-readable data 36 includes bar codes 94, 96, 98, and 100. Each of the bar codes 94, 96, 98, and 100 is associated with a corresponding one of the four transaction items. Once linked to the computer 44, the bar codes 94, 96, 98, and 100 can be used to selectively download individual transaction items from the computer-readable transaction information 46. Alternatively, the bar codes 94, 96, 98, and 100 can encode the transaction information so that the network access apparatus 56 need not link to the computer 44. In this case, the transaction information is read directly by the data reader 54 for entry into the network access apparatus 56.

It is noted the machine-readable data 36 can generally include any of the machine-readable data for network navigation devices described in the above-listed patent applications incorporated by reference into this disclosure.

FIG. 4 is an illustration of a second example of the transaction receipt 26. The transaction receipt 26 documents a transaction between a fictitious XYZ Car Rental company and the fictitious end user John Q. Doe. The transaction receipt 26 is printed by the point of sale terminal 20 at the fictitious XYZ Car Rental company. The transaction receipt 26 is retained by the fictitious end user for his/her records.

The member 32 of the transaction receipt 26 includes a substantially flat substrate formed of a dielectric or nonmagnetic material such as paper, cardboard, or plastic. The human-readable transaction information 34 supported by the member 32 includes information 110 identifying the fictitious car rental company, information 112 identifying the fictitious end user, and information 114 and 116 for two transaction items. Each set of the information 114 and 116 can include a date, a name, a category, and an amount for its corresponding item.

The machine-readable data 36 includes a nonpredictable bar code 120 to identify the transaction. The nonpredictable bar code 120 can be formed in a manner similar to the nonpredictable bar code 92 described with reference to FIG. 3. For purposes of illustration, the nonpredictable bar code 120 encodes an electronic address "www.mot.com/364262749283170522" to identify the computer-readable transaction information 46 for the rental car.

Optionally, the machine-readable data 36 includes bar codes 122 and 124. Each of the bar codes 122 and 124 is associated with a corresponding one of the two transaction items. The bar codes 122 and 124 can be used to selectively download individual transaction items from the computer-readable transaction information 46. Alternatively, the bar codes 122 and 124 can directly encode the transaction information.

Figure 5:
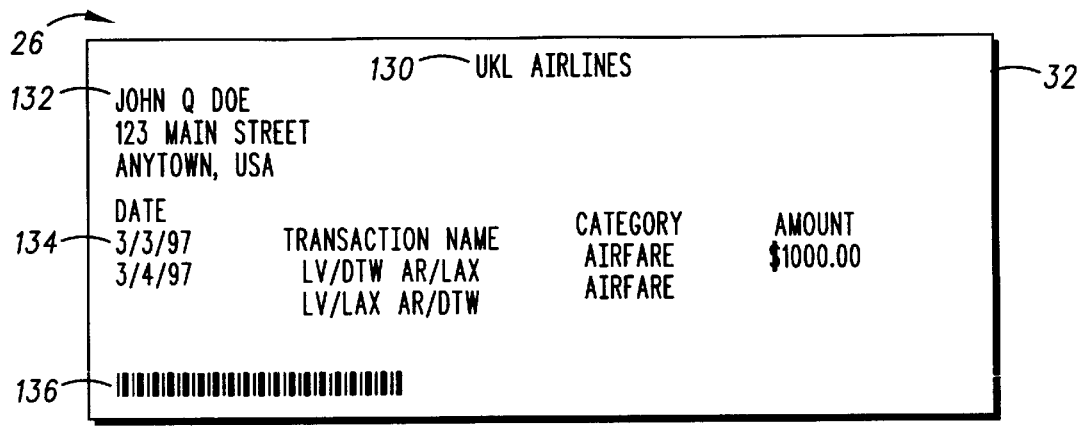
FIG. 5 is an illustration of a third example of the transaction receipt.

FIG. 5 is an illustration of a third example of the transaction receipt 26. The transaction receipt 26 documents a transaction between a fictitious JKL Airlines and the fictitious end user John Q. Doe. The transaction receipt 26 can be printed by the point of sale terminal 20 at an airport or a travel agent's office. The transaction receipt 26 is retained by the fictitious end user for his/her records.

The member 32 of the transaction receipt 26 includes a substantially flat substrate formed of a dielectric or nonmagnetic material such as paper, cardboard, or plastic. The human-readable transaction information 34 supported by the member 32 includes information 130 identifying the fictitious airline company, information 132 identifying the fictitious end user, and information 134 for a transaction item. In this example, the transaction item includes a round trip ticket between Detroit and Los Angeles.

The machine-readable data 36 includes a nonpredictable bar code 136 to identify the transaction. The nonpredictable bar code 136 can be formed in a manner similar to the nonpredictable bar codes 92 and 120. For purposes of illustration, the nonpredictable bar code 120 encodes an electronic address "www.mot.com/822701410713909388" to identify the computer-readable transaction information 46 for the flight.

Figure 6:
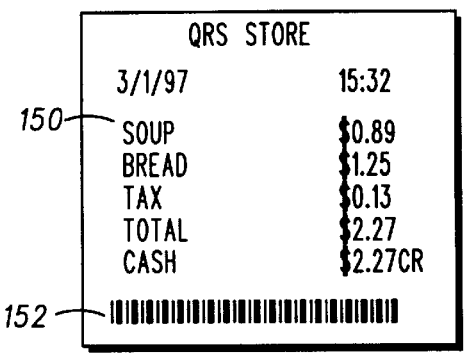
FIG. 6 is an illustration of a fourth example of the transaction receipt.

FIG. 6 is an illustration of a fourth example of the transaction receipt 26. The transaction receipt 26 documents a purchase from a fictitious merchant called QRS Market. The transaction receipt 26 can printed by the point of sale terminal 20 such as a cash register at a store. The transaction receipt 26 is retained by the purchaser for his/her records.

The member 32 of the transaction receipt 26 includes a substantially flat substrate formed of a dielectric or nonmagnetic material such as paper, cardboard, or plastic. The human-readable transaction information 34 supported by the member 32 includes information 150 for a plurality of transaction items, and a nonpredictable bar code 152 to identify the transaction. For purposes of illustration, the nonpredictable bar code 152 encodes an electronic address "www.mot.com/975280970020835872" to identify the computer-readable transaction information 46 for a purchase.

The information 150 is retrieved from a local database based upon a bar code read for each item at the point of sale terminal 20. Preferably, the bar code indicates the type of product or item being identified, a manufacturer of the item, and a product number associated with the item. As such, it is preferred that the bar code includes a UPC code, such as a UPC-A code or a UPC-E code, presently associated with many products. Optionally, the bar code can further include a code for a country of origin of the item. In this case, the bar code can include an EAN/JAN code such as an EAN/JAN-8 code or an EAN/JAN-13 code.

Figure 7:
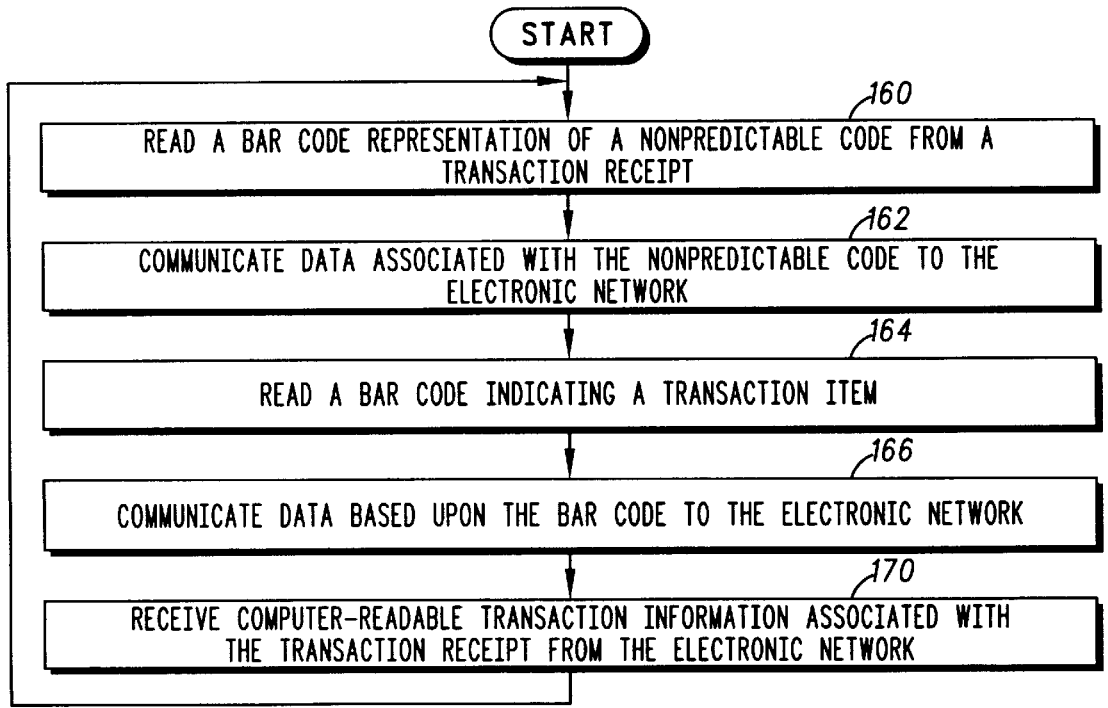
FIG. 7 is a flow chart of an embodiment of a method of downloading the computer-readable transaction information using the transaction receipt.

FIG. 7 is a flow chart of an embodiment of a method of downloading the computer-readable transaction information 46 using the transaction receipt 26. The method is performed at the user location 30 using the data reader 54 and the network access apparatus 56.

As indicated by block 160, the method includes a step of reading a bar code representation of a nonpredictable code from the transaction receipt 26. The bar code representation is read by the data reader 54 and communicated to the network access apparatus 56.

As indicated by block 162, the method includes a step of communicating data associated with the nonpredictable code to the electronic network 52. The data can be included in a request message communicated to the electronic network. Via the electronic network 52, the request message including the data is communicated to the computer 44. The computer 44 retrieves the computer-readable transaction information 46 from the database 50 using the nonpredictable code. The computer-readable transaction information 46 is communicated from the computer 44 to the network access apparatus 56 via the electronic network 52. Examples of the computer-readable transaction information 46 include a list of items in the transaction, dates and times associated with the items, charges or credits associated with the items, and the parties involved in the transaction.

Optionally, as indicated by blocks 164 and 166, the method includes steps of reading a bar code indicating a transaction item, and communicating data based thereupon to the electronic network 52. For example, the step of reading a bar code can include reading one or more of the bar codes 94, 96, 98, and 100 in FIG. 3 or the bar codes 122 and 124 in FIG. 4. In this case, the computer 44 retrieves and communicates only the selected transaction item to the network access apparatus 56.

As indicated by block 170, the method includes a step of receiving the computer-readable transaction information 46 associated with the transaction receipt 26. In a preferred embodiment, the computer-readable transaction information 46 is received in a format importable to many accounting software programs. Examples of the format include but are not limited to the Quicken Interchange Format (QIF) and formats based upon the Open Financial Exchange framework.

The above-described method can be integrated with an accounting routine, a spreadsheet routine, an expense report routine, or a tax form preparation routine executed by the network access apparatus 56. The software routine can be encoded as computer-readable data stored by a computer-readable storage medium such as an optical disk, a CD-ROM, a PCMCIA card, a floppy disk, a hard disk, or a DVD, for example. In these cases, the computer-readable transaction information 46 is automatically imported into an electronic account provided by the software routine. Thereafter, the computer-readable transaction information 46 can be processed, displayed, printed, or communicated by the network access apparatus 56 in accordance with any of the features provided by the software routine.

Figure 8:
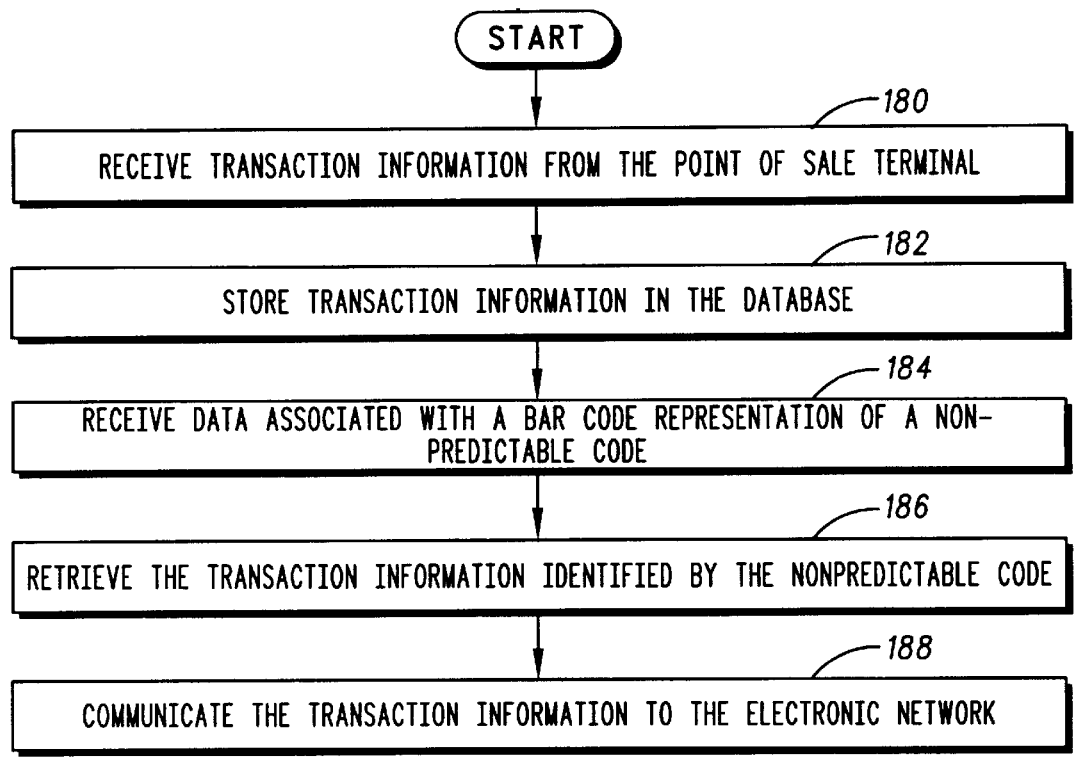
FIG. 8 is a flow chart of an embodiment of a method of receiving and distributing the computer-readable transaction information.

FIG. 8 is a flow chart of an embodiment of a method of receiving and distributing the computer-readable transaction information 46. The method includes database management steps performed using the computer 44 and the database 50.

As indicated by block 180, the method includes a step of receiving transaction information from the point of sale terminal 20. Examples of the transaction information include but are not limited to a list of items in the transaction, dates and times associated with the items, charges or credits associated with the items, and the parties involved in the transaction. Additionally, the computer 44 can receive the nonpredictable code which identifies the transaction from the point of sale terminal 20.

As indicated by block 182, the method includes a step of storing the transaction information in the database 50. The transaction information can be stored in a file dedicated therefor. In this case, the file can have a filename formed using the nonpredictable code. Alternatively, the transaction information can be stored in a record which includes the nonpredictable code. Such a record is content addressable using the nonpredictable code.

As indicated by block 184, the method includes a step of receiving data associated with a bar code representation of the nonpredictable code. The data can be included in a request for the transaction information. The data is generated by the data reader 54 and the network access apparatus 56 at the user location 30. The data is received from the user location 30 at a time subsequent to a time at which the transaction information is received from the point of sale terminal 20.

As indicated by block 186, the method includes a step of retrieving the computer-readable transaction information 46 identified by the nonpredictable code. The computer-readable transaction information 46 is retrieved from a record or a file in the database 50 identified by the nonpredictable code. Optionally, the step of retrieving can include a step of maintaining a count of how many times computer-readable transaction information is retrieved. The count can be indexed by parties of the transaction (e.g. by merchant or by end user) or by each transaction.

As indicated by block 188, the method includes a step of communicating the computer-readable transaction information 46 to the electronic network 52. The electronic network 52, in turn, communicates the information to the network access apparatus 56. Examples of the computer-readable transaction information 46 include a list of items in the transaction, dates and times associated with the items, charges or credits associated with the items, and the parties involved in the transaction.

FIG. 9 illustrates an example of data stored by the database 50. The example is based upon the computer 44 receiving transaction data corresponding to the transaction receipts of FIGS. 3 to 6. The computer 44 receives the transaction data from point of sale terminals at the fictitious ABC Hotel, XYZ Car Rental, JKL Airlines, and QRS Market.

The database 50 includes a first record 200 identified by a first nonpredictable code 202, a second record 204 identified by a second nonpredictable code 206, a third record 210 identified by a third nonpredictable code 212, and a fourth record 214 identified by a fourth nonpredictable code 216. The first nonpredictable code 202 corresponds to the sequence "598843631937665892" encoded on the transaction receipt of FIG. 3, the second nonpredictable code 206 corresponds to the sequence "364262749283170522" encoded on the transaction receipt of FIG. 4, the third nonpredictable code 212 corresponds to the sequence "822701410713909388" encoded on the transaction receipt of FIG. 5, and the fourth nonpredictable code 216 corresponds to the sequence "975280970020835872" encoded on the transaction receipt of FIG. 6.

Figure 10:
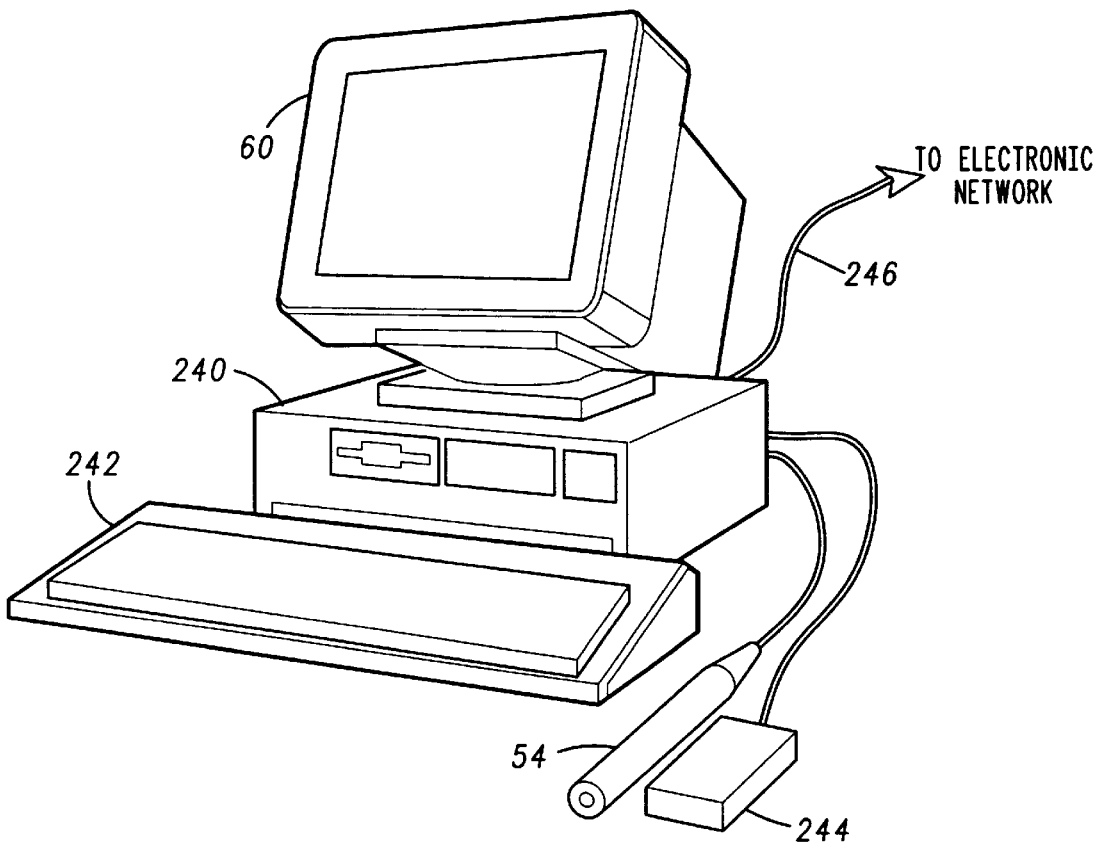
FIG. 10 is an illustration of an example of the data reader and the network access apparatus at the user location.

FIG. 10 is an illustration of an example of the data reader 54 and the network access apparatus 56 at the user location 30. In this example, the network access apparatus 56 comprises a personal computer 240, and at least one input device including a keyboard 242 and a mouse 244. The display device 60 comprises a monitor connected to a video port of the personal computer 240. The data reader 54 includes a bar code reader connected to a serial port of the personal computer 240.

The personal computer 240 includes a modem, a network adapter, or other transceiver for communicating with the electronic network 52. The modem or the network adapter can communicate with the electronic network 52 via a line 246 such as a telephone line, an ISDN line, a coaxial line, a cable television line, a fiber optic line, a computer network line, or the like. Alternatively, the modem or the network adapter can wirelessly communicate with the electronic network 52.

FIG. 11 is an illustration of an example of the report 66 formed using the transaction receipts described with reference to FIGS. 3, 4, and 5. In this example, the report 66 is formatted as an expense report for business-related travel by the fictitious end user John Q. Doe.

The end user generates the report 66 by reading the nonpredictable bar codes 92, 120, and 152 using the data reader 54. In response thereto, the network access apparatus 56 communicates the nonpredictable codes via the electronic network 52 to the computer 44. The computer 44 retrieves computer-readable transaction information for each transaction receipt based upon the nonpredictable codes. The computer-readable transaction information is communicated to the network access apparatus 56.

The network access apparatus 56 compiles the transaction information to generate the report 66. In particular, the network access apparatus 56 formats the transaction information based on the date and the category. Additionally, the network access apparatus 56 processes the dollar amounts to form marginal tallies by day and by category. Further, the network access apparatus 56 forms a total dollar amount for the expense report. The report 66 is printed by the hard copy device 64.

Additionally, the network access apparatus 56 can store the transaction information and/or an electronic form of the report 66 in its memory or its storage device. Further, the display device 60 can display a human-readable form of the transaction information and/or the report 66.

Thus, there has been described herein several embodiments including preferred embodiments of accounting methods and systems.

Because the various embodiments of the present invention associate a nonpredictable bar code with a transaction receipt, they provide a significant improvement in that transaction data associated with the transaction receipt can be accessed by an end user without concern of access by unauthorized parties.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A database management method comprising the steps of:

receiving and storing transaction information associated with a nonpredictable bar code, the transaction information generated by a transaction terminal;

receiving a request for the transaction information including data associated with the nonpredictable bar code;

retrieving the transaction information based upon the nonpredictable bar code; and communicating the transaction information.

2. The database management method of claim 1 wherein the transaction information is communicated via one of the Internet and an intranet.

3. The database management method of claim 1 wherein the request is received via an electronic network.

4. The database management method of claim 1 wherein the request includes a bar code identifying an item in the transaction, and wherein the step of retrieving includes retrieving transaction information for the item.

5. The database management method of claim 1 wherein the nonpredictable bar code encodes an electronic address.

6. The database management method of claim 5 wherein the electronic address includes a predictable portion concatenated with a nonpredictable portion.

7. The database management method of claim 1 wherein the nonpredictable bar code encodes a pseudorandom sequence.

8. The database management method of claim 1 further comprising the step of storing the transaction data in a file having a filename based upon the nonpredictable bar code.

9. A transaction information system comprising:

a computer which receives transaction information associated with a nonpredictable bar code, the transaction information generated by a transaction terminal, and a database responsive to the computer to store the transaction information and to retrieve the transaction information based upon a request received by the computer, the request including data associated with the nonpredictable bar code, wherein the transaction information is retrieved from the database based upon the nonpredictable bar code, and wherein the computer communicates the transaction information retrieved from the database.

10. The transaction information system of claim 9 wherein the computer communicates the transaction information retrieved from the database via one of the Internet and an intranet.

11. The transaction information system of claim 9 wherein the nonpredictable bar code encodes an electronic address of the computer.

12. The transaction information system of claim 11 wherein the electronic address includes a predictable portion concatenated with a nonpredictable portion.

13. The transaction information system of claim 9 wherein the nonpredictable bar code encodes a pseudorandom sequence.

14. A method comprising the steps of:

entering transaction information for a transaction between a first party and a second party, the transaction information entered at a point of sale associated with the first party;

printing, at the point of sale, a transaction receipt having a bar code which encodes a uniform resource locator, the uniform resource locator having a pseudorandom portion;

storing the transaction information at a transaction information source accessible via an internet, wherein the transaction information is identifiable by the uniform resource locator;

reading the bar code from the transaction receipt using a bar code reader at a location other than a point of sale associated with the first party;

retrieving, from the transaction information source via the internet, the transaction information based upon the uniform resource locator encoded by the bar code; and storing the retrieved transaction information in a computer-readable form at the location.

\* \* \* \* \*